UNITED STATES PATENT OFFICE.

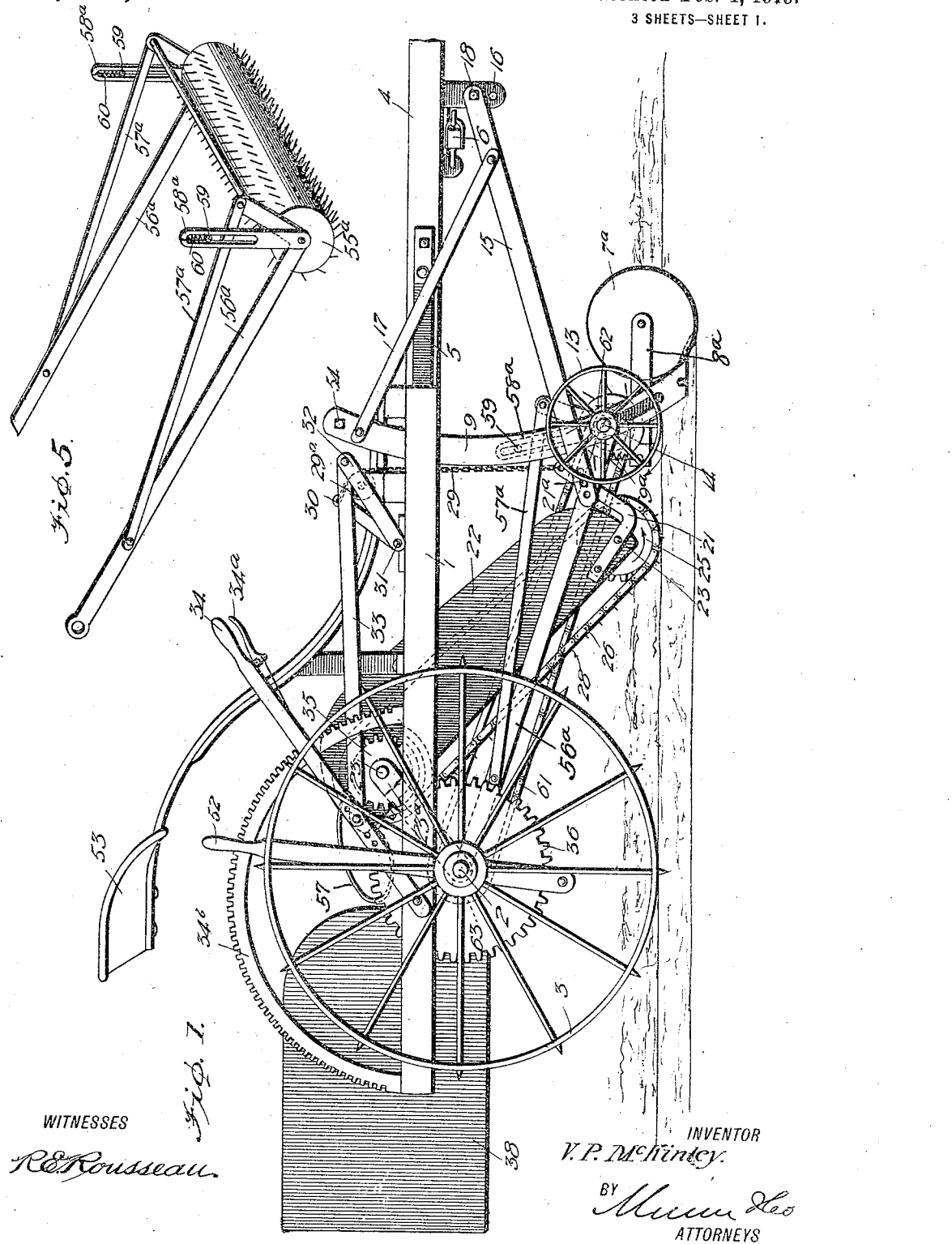

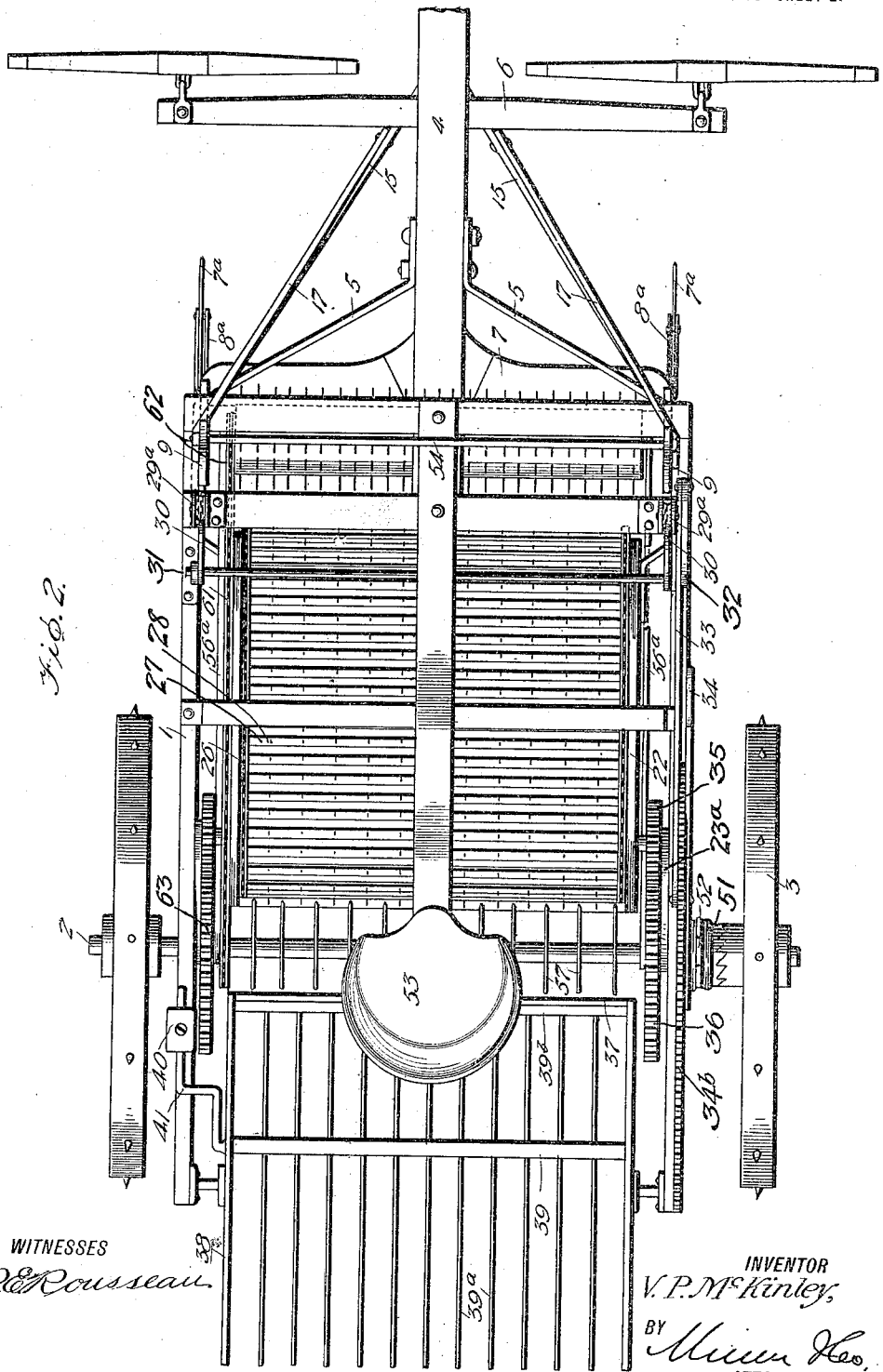

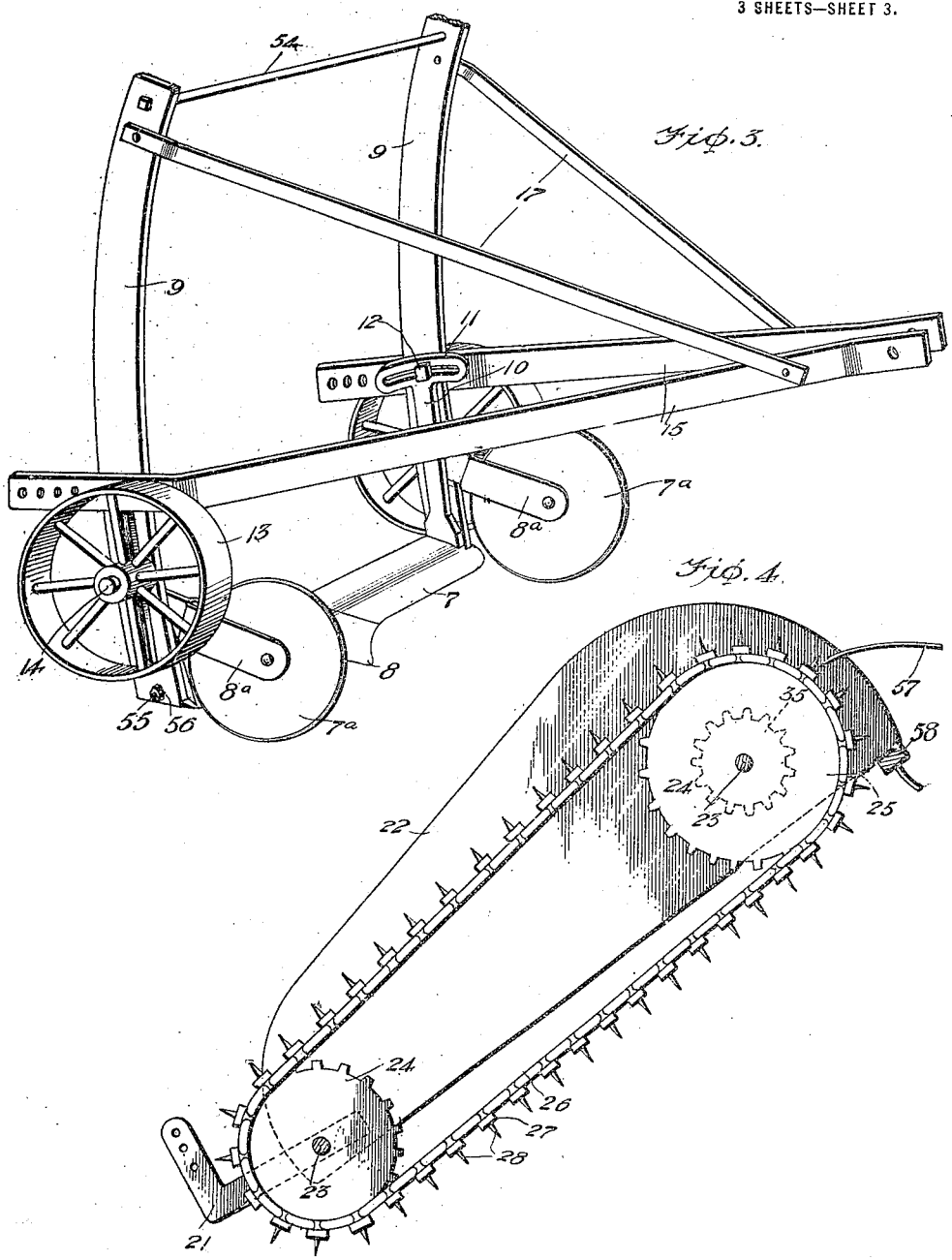

VERGIL P. McKINLEY, OF UNIVERSITY, ALABAMA.

PEANUT-DIGGER.

1,293,144.
Specification of Letters Patent.
Patented Feb. 4, 1919.

Application filed March 15, 1918. Serial No. 222,656.

*To all whom it may concern:*

Be it known that I, VERGIL P. MCKINLEY, a citizen of the United States, and a resident of University, in the county of Tuscaloosa and State of Alabama, have invented certain new and useful Improvements in Peanut-Diggers, of which the following is a specification.

My invention is an improvement in peanut diggers, and has for its object to provide a device of the character specified, especially devised for harvesting peanuts and the like, wherein a supporting frame is provided having digging mechanism and conveying mechanism for receiving the vines from the digging mechanism, and having dropping mechanism to which the vines are delivered and from which they are dropped at regular intervals.

In the drawings:

Figure 1 is a side view of the improved digger;

Fig. 2 is a top plan view;

Fig. 3 is a perspective view of the digging mechanism detached;

Fig. 4 is a longitudinal section of the conveyer detached;

Fig. 5 is a detail perspective view of a toothed roller and frame.

In the present embodiment of the invention, a supporting frame 1 is provided, having arranged thereon an axle 2 to which wheels 3 are connected. A tongue 4 extends forwardly from the front of the frame, said tongue being braced against the frame as shown at 5, and draft mechanism, indicated at 6, is connected with the tongue.

The digging mechanism comprises a plow 7 in the form of a blade having one edge formed into a cutting edge and having at the center of the said edge a substantially triangular extension 8, the sides of the extension being also sharpened. This plow is connected at its ends to the lower ends of supporting plates 9, which have slidable connection with the side members of the frame 1, to permit the said plates, which are shaped, as shown, to move upwardly or downwardly for purposes of adjustment.

The blade is pivoted to the supporting plates, and at one end the blade has an upwardly extending arm 10, having at its upper end a cross head 11 provided with a longitudinal slot. This arm extends alongside the inner face of one of the plates 9, and a bolt 12 passes through the slot of the cross head and through the plate 9 to hold the arm in adjusted position.

It will be evident that by loosening the bolt the digging angle of the plow may be varied. Wheels 13 are arranged at the outer faces of the plates 9 and the said wheels, by their engagement with the surface of the ground, limit the depth of penetration of the plow. Each of these wheels is journaled on a journal pin 14 and each journal pin is adjustably connected with the adjacent plate in a manner to be presently described.

Links 15 are secured at their rear ends to the plates 9 and are pivotally connected at their forward ends to downwardly extending brackets 16 on the tongue. Braces 17 extend from the upper ends of the plates 9 to a connection with the links 15 near their forward ends, and these braces and the links compel the plates to swing on a center which is the pivotal connection between the front ends of the links 15 and the brackets 16. It will be noticed from an inspection of Fig. 1 that these brackets have a series of openings and the bolt 18 which connects the links 15 with the brackets may be engaged with any of the openings to vary the point upon which the cutting mechanism swings. These plates 9, links 15 and brace 17 with connected parts constitute an auxiliary frame which supports the plow and associated parts.

A rolling colter $7^a$ is arranged at each end of the plow and in front of the same for the purpose of cutting grass, vines and the like which might cause the plow to choke. They are journaled in supporting yokes $8^a$ which are pivoted to the plates 9 and the yokes are normally pressed downward by springs $9^a$, to cause the rollers to cut to about the depth of the plow but to permit them to yield in case of obstruction to prevent damage.

The rear ends of the links 15 are pivotally connected to angle brackets 21 which are secured to the front end of the elevator or conveyer frame to be presently described. This frame consists of side plates 22 which are connected by shafts 23, and sprocket wheels 24 and 25 are secured to the said shafts. An apron is supported by the sprocket wheels, the said apron consisting of endless chains 26 which are connected by slats 27, and the slats have outwardly extending spikes 28 arranged at spaced intervals.

The shaft 23 at the rear end of the frame is connected to the axle by plates 23ª, which are pivoted to the axle at one end and to the shaft 23 at the other in such manner that the frame may swing on the axle. One of the angle plates 21 is connected with each side plate 22 of the frame, and each angle plate is connected to the adjacent link 15, as indicated at 21ª, by a bolt and nut connection. It will be noted that each angle plate has a series of openings, as has also the link, for engagement by the bolt, so that the front end of the carrier may be raised or lowered with respect to the links, or may be moved forwardly and backwardly as may be desired.

A flexible member 29, a chain in the present instance, is connected with each angle plate 21 at the upper end thereof, and each of these chains 29 is connected with a radial arm 30 on a shaft 31 journaled on the frame, each chain passing over a roller 29ª adjacent to the arm 30.

The shaft 31 has a radial arm 32 which is connected by a link 33 with a lever 34 pivoted on the frame. The said lever has latch mechanism indicated at 34ª, which coöperates with a toothed sector 34ᵇ secured to the frame for holding the lever in adjusted position. By means of the lever the front end of the elevator and the plow may be simultaneously raised and lowered. The shaft 23 at the rear of the conveyer frame has a gear wheel 35 which meshes with a gear wheel 36 on the axle 2, to drive the elevator or conveyer. The rear end of the elevator delivers to the dropper.

A toothed roller 55ª is mounted between the plates 9 above and in rear of the plow, and between the same and the front end of the conveyer. This roller is journaled in angle plates 56ª, each of which consists of a long arm and a short arm, as shown in Fig. 5, and the roller is journaled at the junction of the arms. The short arm of each angle plate is braced against the long arm by an inclined brace 57ª, and a plate 58ª extends upwardly from each journal pin of the roller. Each of these plates is longitudinally slotted near its upper end, and a pin 59 on the adjacent plate 9 engages the slot.

A coil spring 60 is arranged between each pin and the upper end of the plate, the springs normally pressing the roller downwardly but permitting the same to yield upwardly to prevent injury from obstructions.

It will be noted that the teeth of the roller are inclined, and the roller is rotated in the direction of the arrow adjacent thereto in Fig. 1, by means of a sprocket chain 61, which engages at one end a sprocket wheel 62 on the roller, and at the other end a sprocket wheel 63 on the axle 2. The upper ends of the plates 9 are connected by a cross rod 54, and a suitable seat 53 is provided.

The rear end of the elevator has a series of curved fingers 57 which curve downwardly, rearwardly and upwardly from a cross bar 58 to extend toward the spurs of the carrier as it passes over the rearmost sprocket wheels 24. These fingers prevent the vines from clinging to the carrier and cause it to deliver them to the dropper.

In operation, the machine is driven through the field with the wheels 3 astride the row. The plow 7—8 is adjusted to the proper depth by means of the wheels 13 and to the proper inclination by means of the arms 10. The adjustment of the plow adjusts also the front end of the elevator. The plow will dig the peanuts and the toothed roller will deliver them to the elevator or conveyer, which will take them up and in turn deliver them to the dropper.

I claim:

1. In a peanut digger, a supporting frame, links pivoted at the front of the frame, arc shaped plates connected at their lower ends to the links at the rear ends thereof and slidably connected with the frame to move upwardly and downwardly, braces between the upper ends of the plates and the links, a plow connected with the lower ends of the plates, and wheels journaled on the plates for limiting the depth of penetration of the plow.

2. In a peanut digger, a supporting frame, links pivoted at the front of the frame, arc shaped plates connected at their lower ends to the links at the rear ends thereof and slidably connected with the frame to move upwardly and downwardly, a plow connected with the lower ends of the plates, and wheels journaled on the plates for limiting the depth of penetration of the plow.

3. In a peanut digger, a digging device comprising a supporting frame, an auxiliary frame carrying a blade and mounted to swing vertically with respect to the supporting frame, wheels at the sides of the frame for limiting the penetration of the blade, a conveyer mounted in rear of the digging device on the frame, the rear end of the conveyer being swingably connected to the frame, a connection between the front end and the auxiliary frame, and a common means for raising and lowering said auxiliary frame and the conveyer.

4. In a peanut digger, a supporting frame, an auxiliary frame carrying digging means and mounted to swing vertically with respect to the supporting frame, a conveyer mounted in rear of the auxiliary frame, the rear end of the conveyer being swingably connected to the supporting frame, a common means for raising and lowering said auxiliary frame and the conveyer, and a toothed roller mounted to rotate between the digging means and the adjacent end of the conveyer for delivering to the conveyer.

5. In a peanut digger, a supporting frame, an auxiliary frame carrying a blade and mounted to swing vertically with respect to the supporting frame, a conveyer mounted in rear of the auxiliary frame, the rear end of the conveyer being swingably connected to the supporting frame, a connection between the front end of the conveyer and the auxiliary frame, and a common means for raising and lowering said auxiliary frame and the conveyer.

VERGIL P. McKINLEY.

Copies of this patent may be obtained for five cents each, by addressing the "Commissioner of Patents, Washington, D. C."